Dec. 1, 1936.  L. L. RUSTAD  2,063,006
SIGN PRODUCING MACHINE
Filed Jan. 9, 1932  10 Sheets-Sheet 1
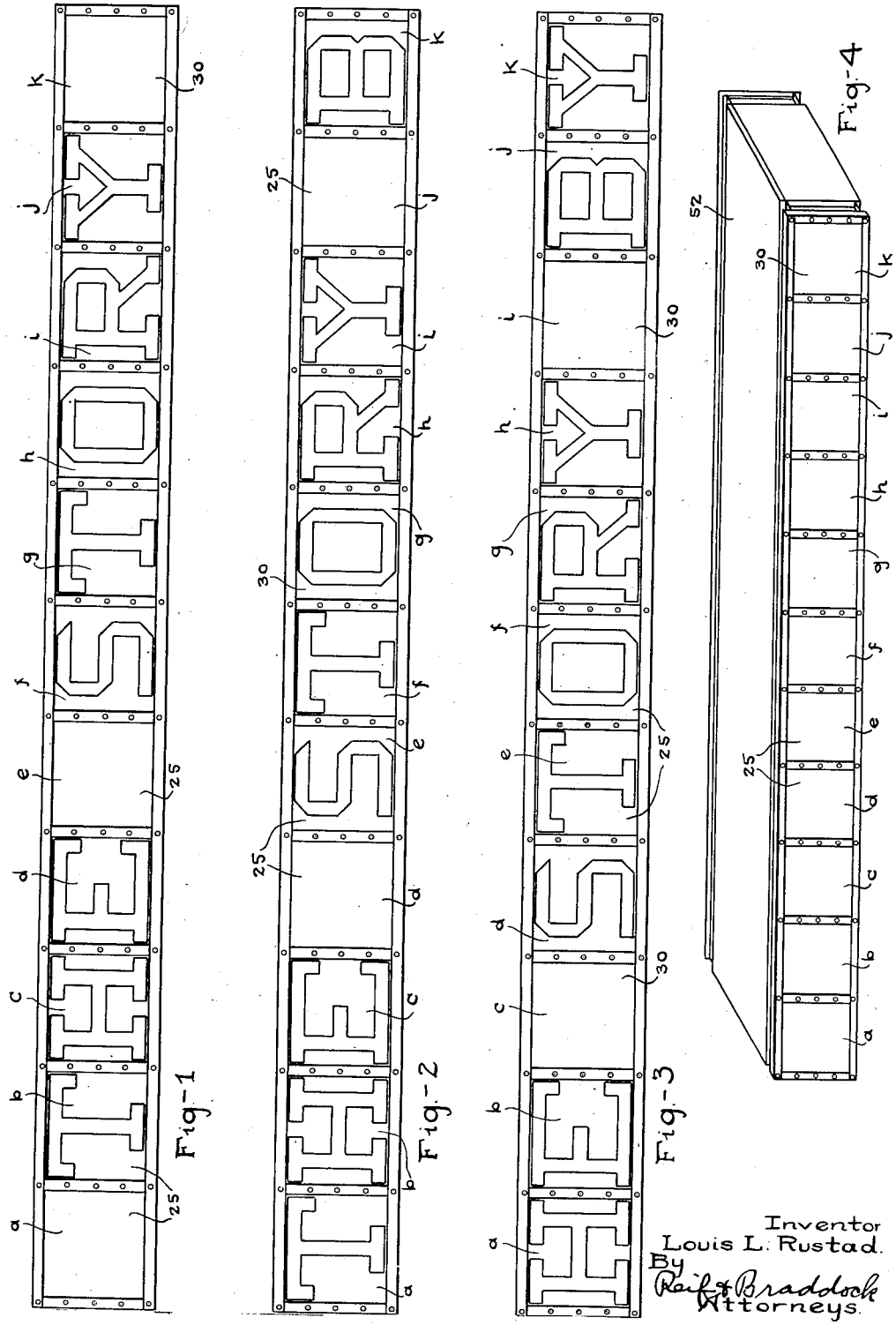
Inventor
Louis L. Rustad.
By
Reif & Braddock
Attorneys.

Dec. 1, 1936.   L. L. RUSTAD   2,063,006
SIGN PRODUCING MACHINE
Filed Jan. 9, 1932   10 Sheets-Sheet 2
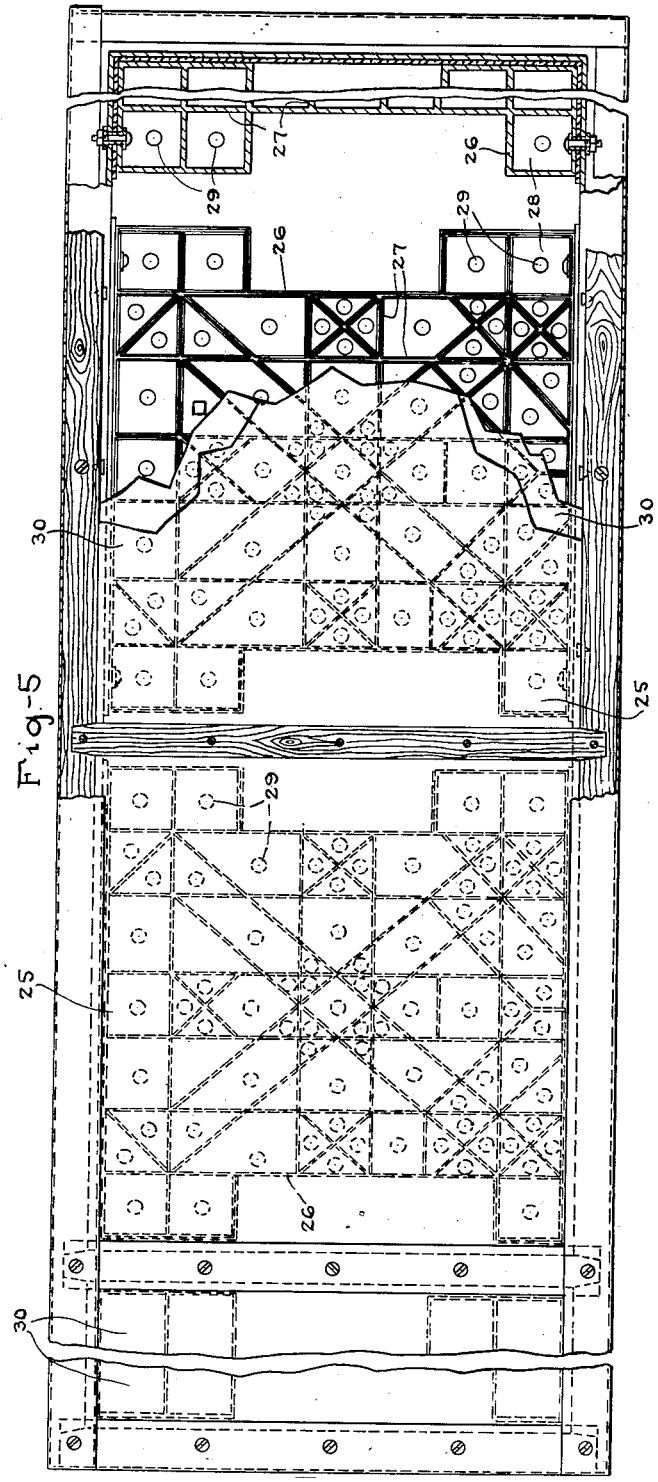
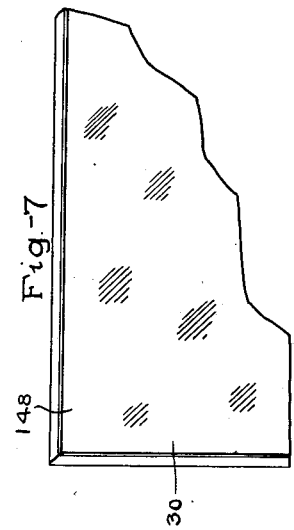
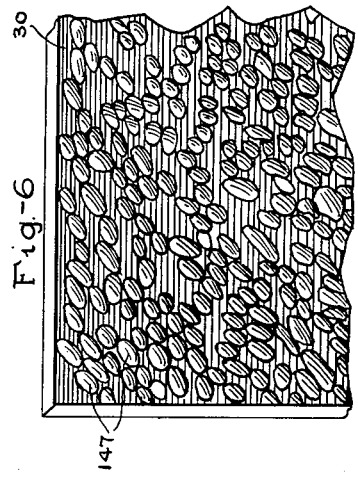
Inventor:
Louis L. Rustad.
By Reif & Braddock
Attorneys

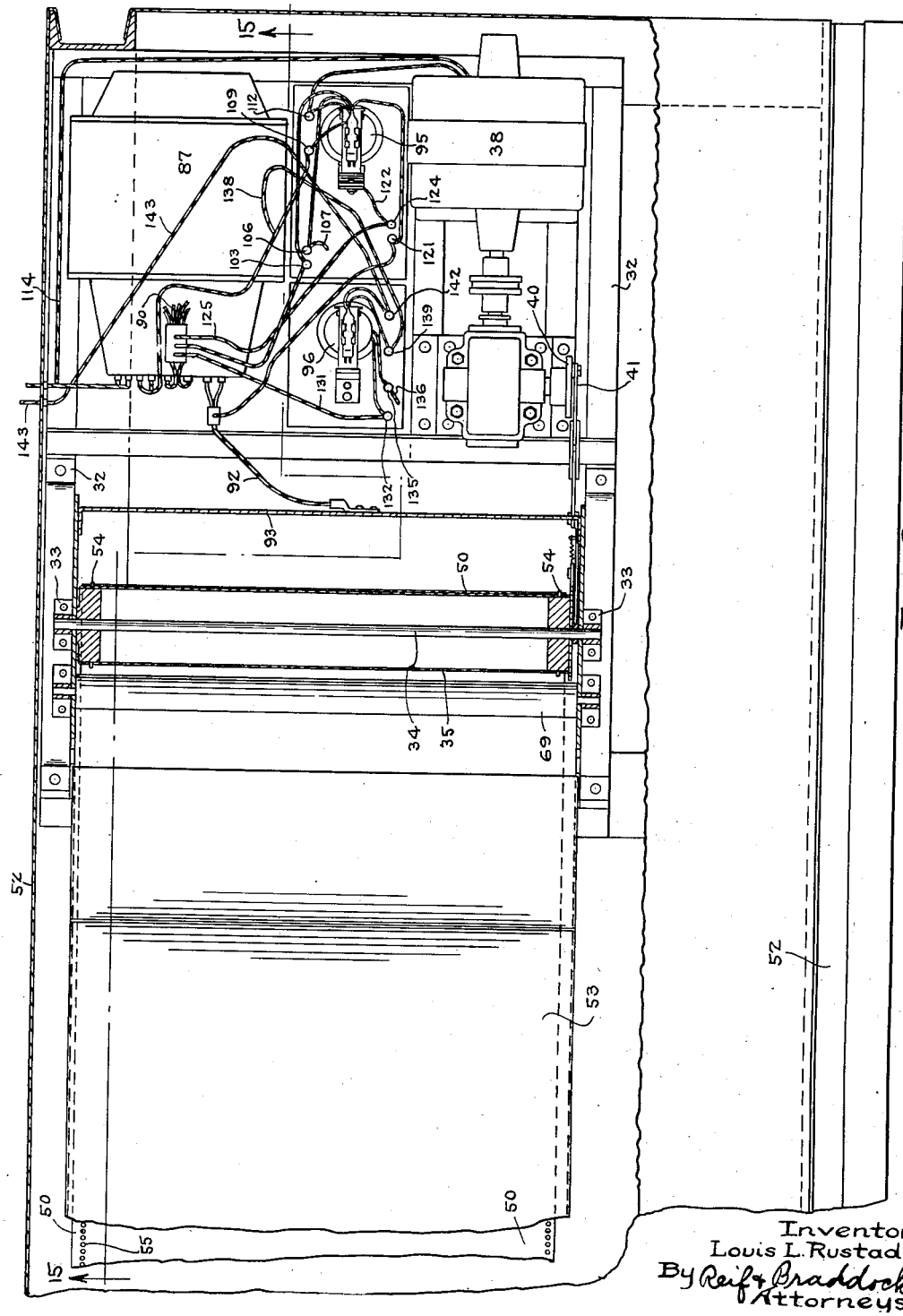

Dec. 1, 1936.  L. L. RUSTAD  2,063,006
SIGN PRODUCING MACHINE
Filed Jan. 9, 1932  10 Sheets-Sheet 4
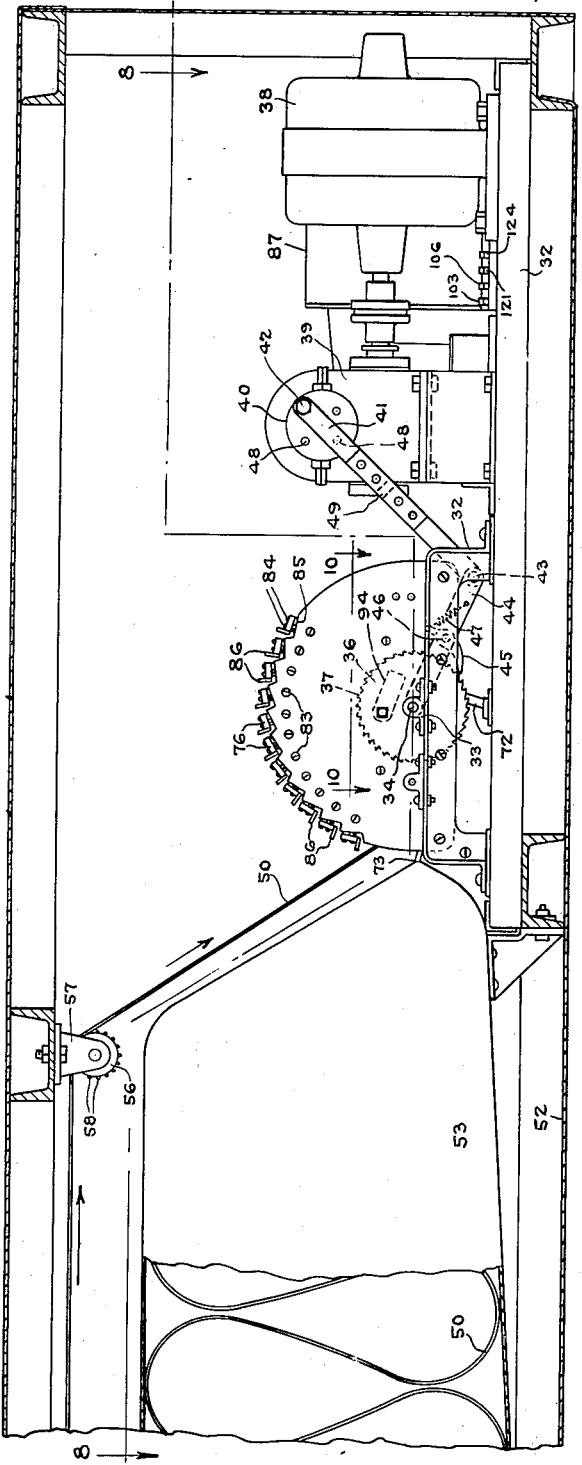
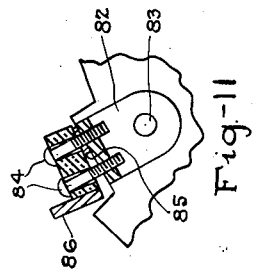
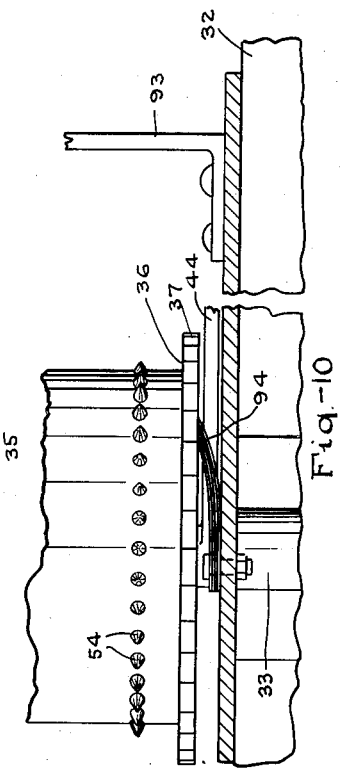
Inventor
Louis L. Rustad.
By Reif & Braddock
Attorneys.

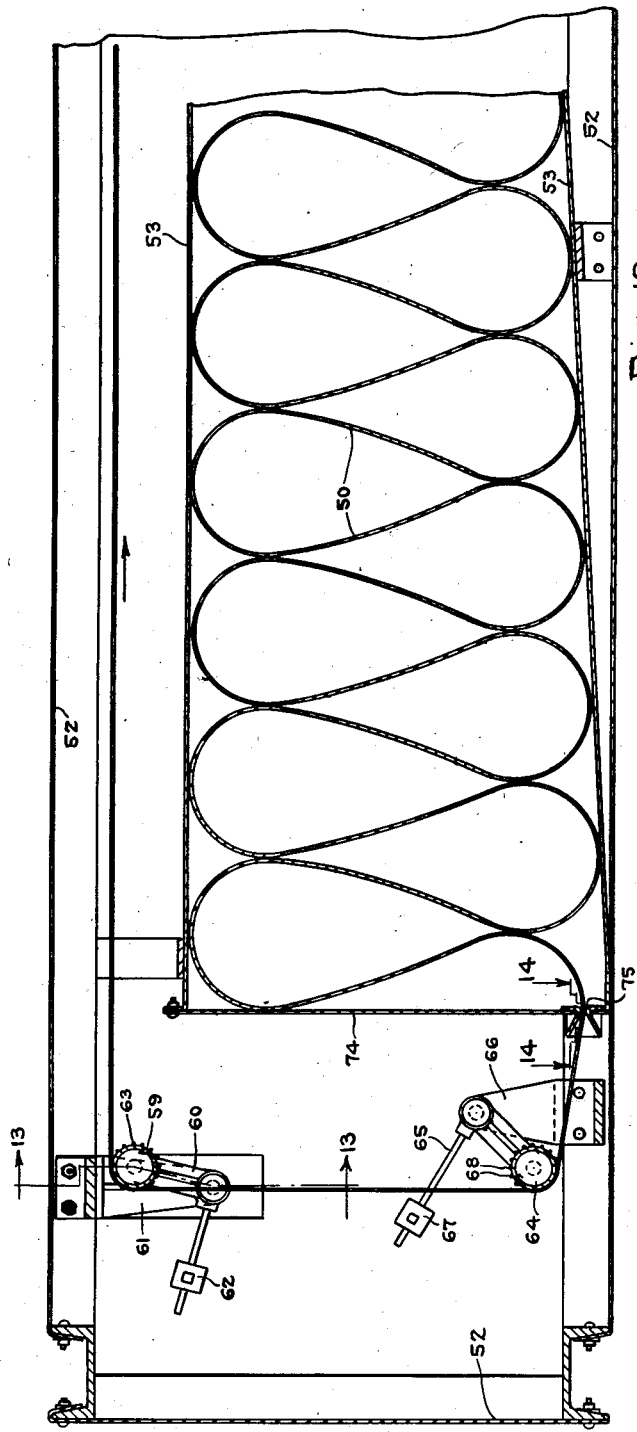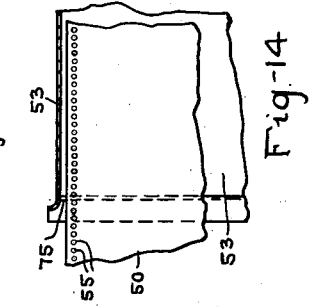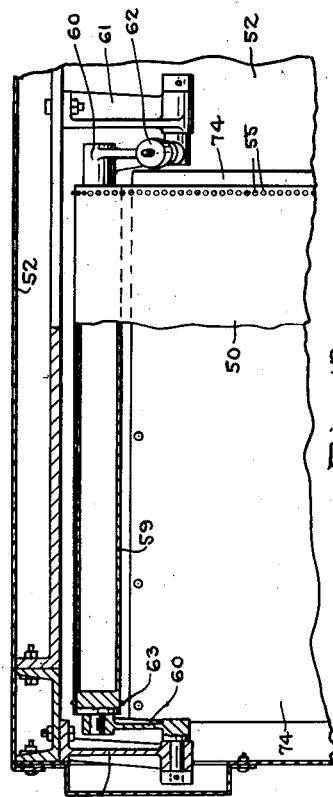

Dec. 1, 1936.                L. L. RUSTAD                2,063,006
                        SIGN PRODUCING MACHINE
                    Filed Jan. 9, 1932        10 Sheets-Sheet 6
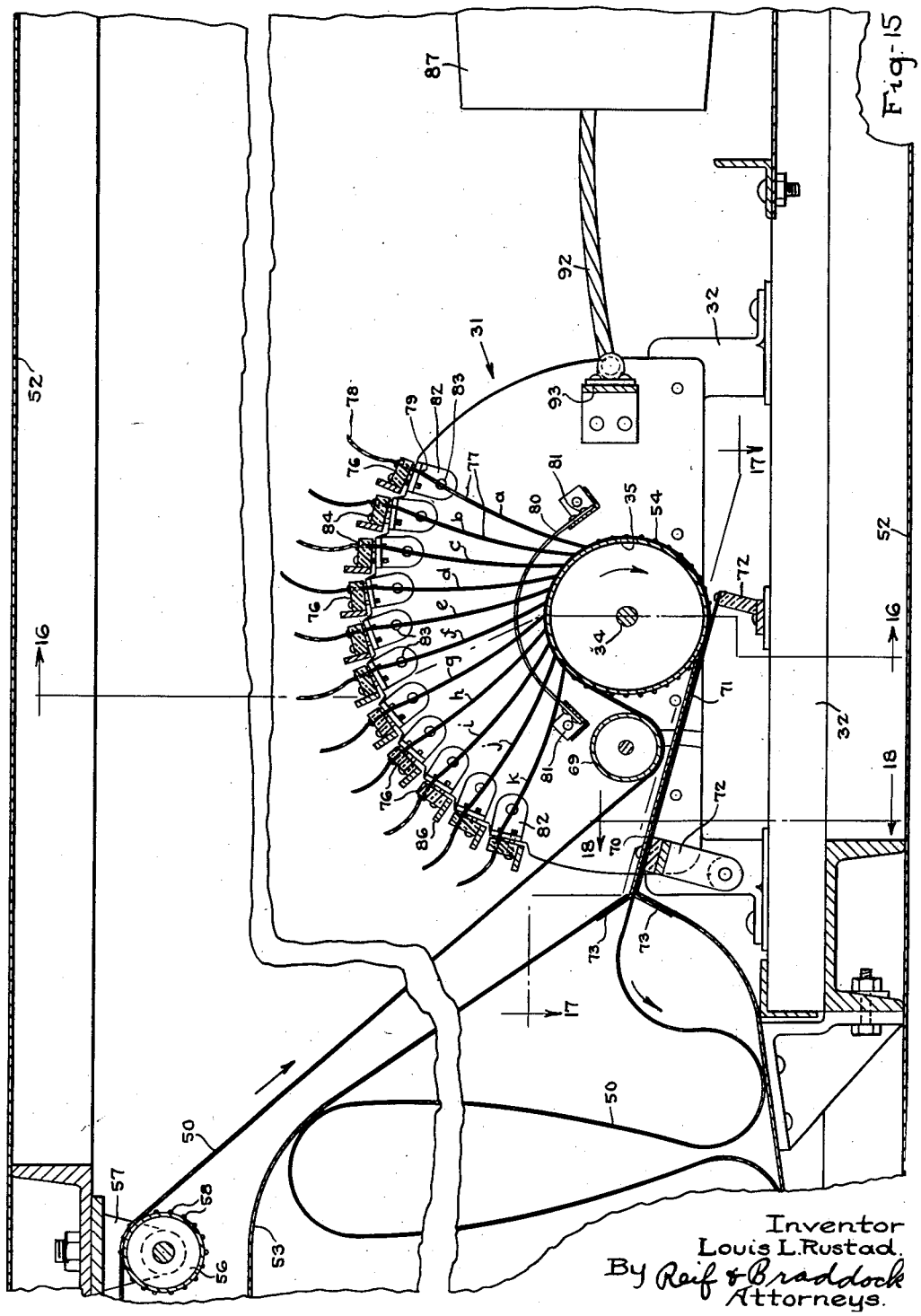
Inventor
Louis L. Rustad.
By Reif & Braddock
Attorneys.

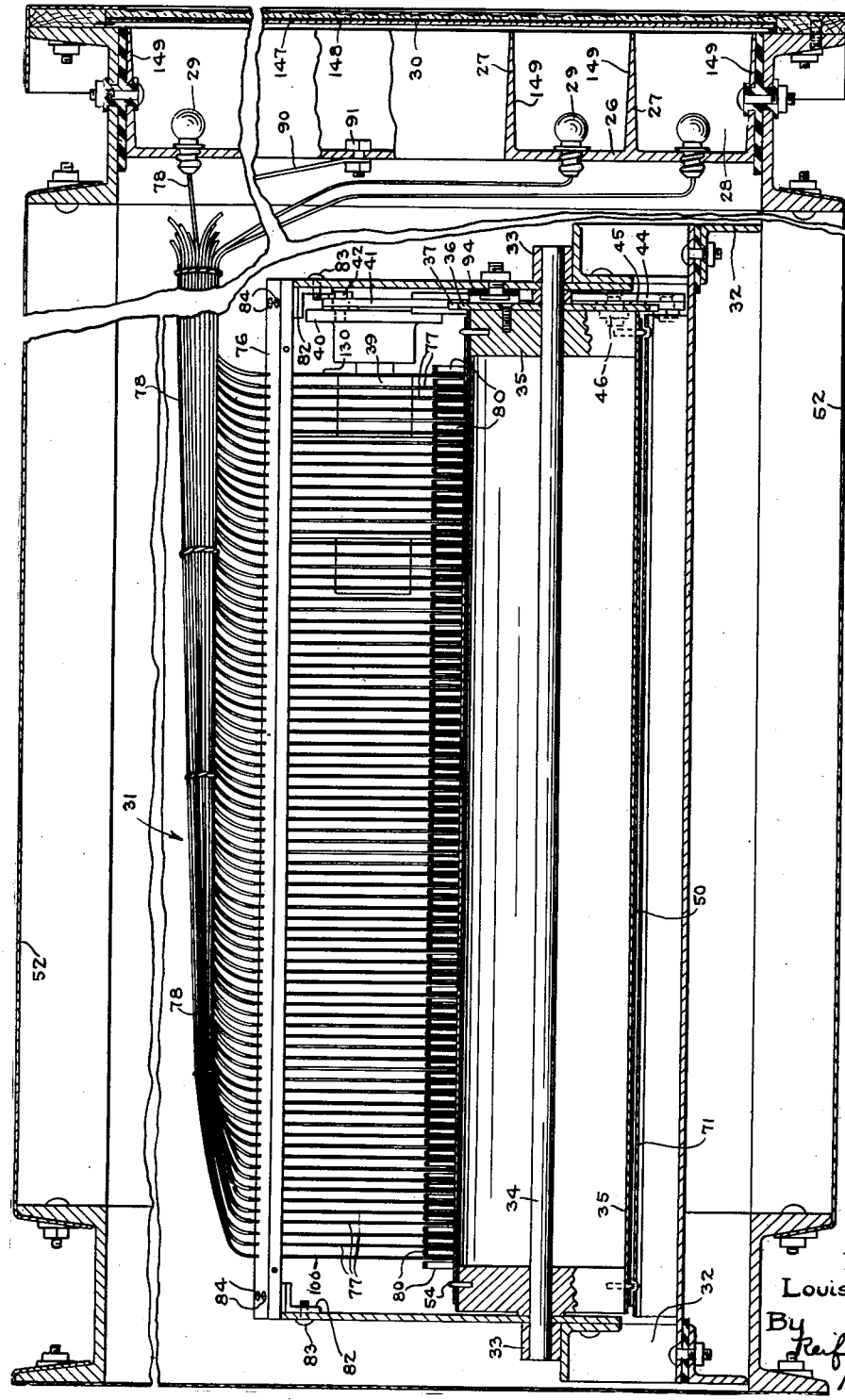

Dec. 1, 1936.  L. L. RUSTAD  2,063,006
SIGN PRODUCING MACHINE
Filed Jan. 9, 1932  10 Sheets-Sheet 8
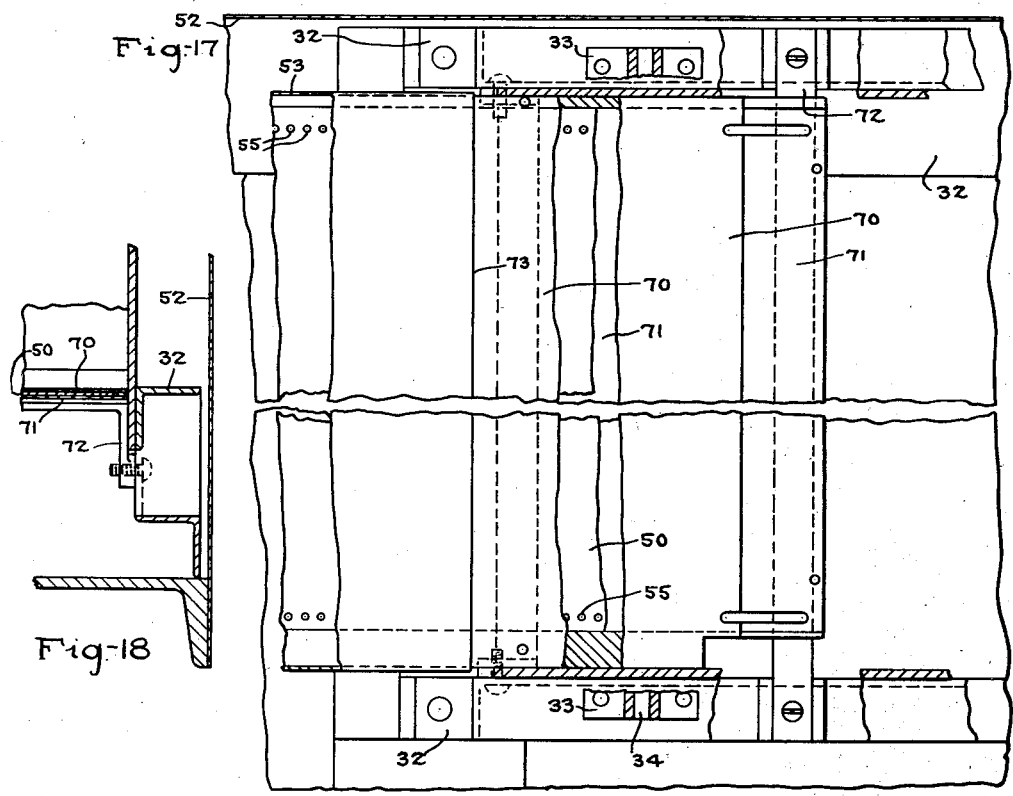
Fig-17
Fig-18
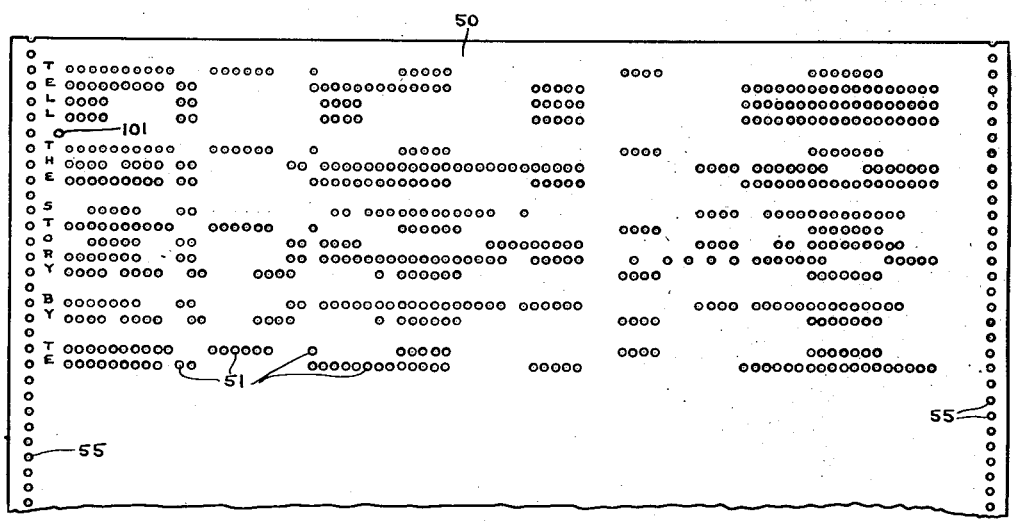
Fig-19
Inventor:
Louis L. Rustad.
By Reift Braddock
Attorneys Dec. 1, 1936.                L. L. RUSTAD                2,063,006
                        SIGN PRODUCING MACHINE
              Filed Jan. 9, 1932            10 Sheets-Sheet 9

Inventor
Louis L. Rustad
By Reif + Braddock
       Attorneys.

Dec. 1, 1936. L. L. RUSTAD 2,063,006
SIGN PRODUCING MACHINE
Filed Jan. 9, 1932 10 Sheets-Sheet 10
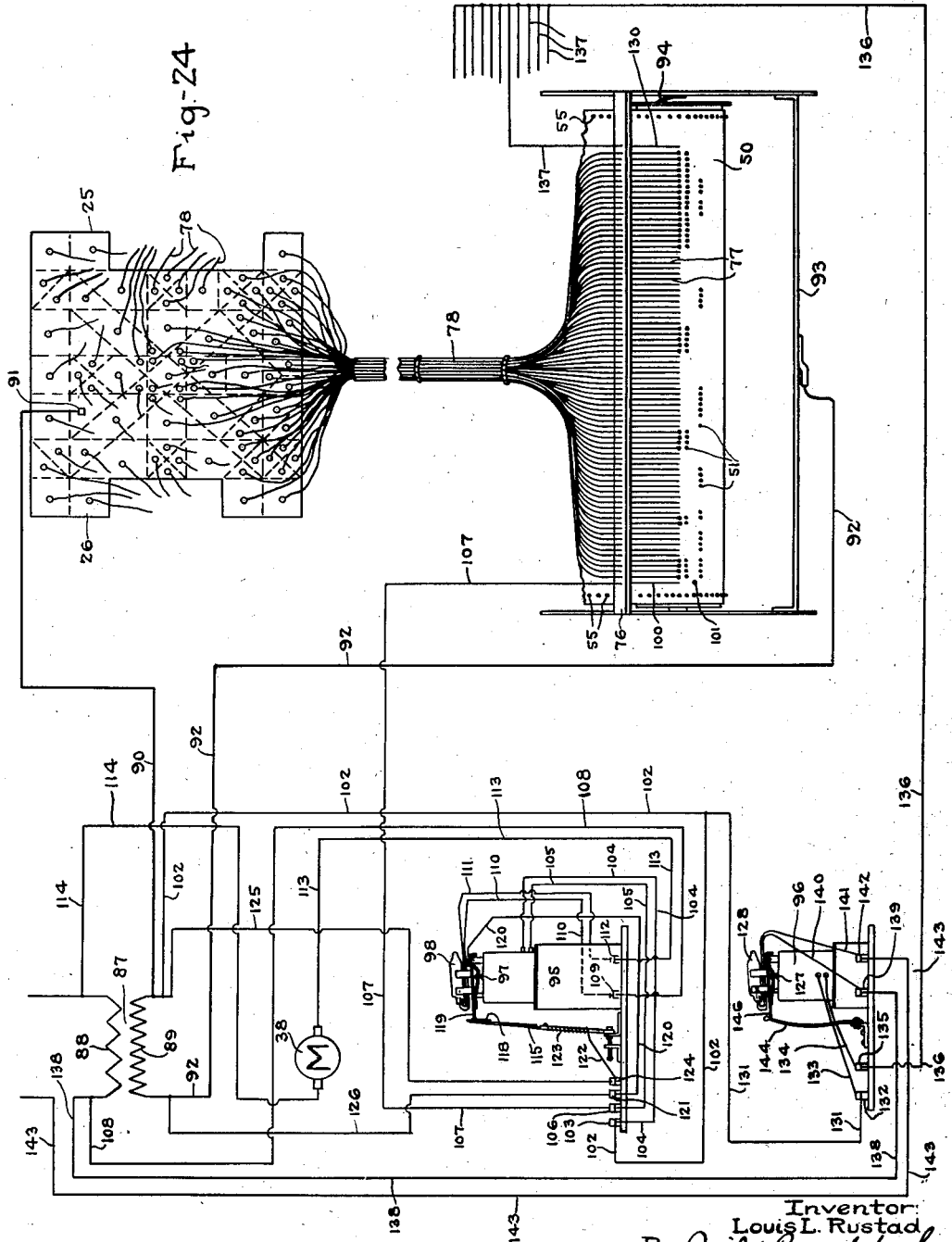
Inventor:
Louis L. Rustad
By Reif & Braddock
Attorneys.

Patented Dec. 1, 1936

2,063,006

UNITED STATES PATENT OFFICE 2,063,006

SIGN PRODUCING MACHINE

Louis L. Rustad, Minneapolis, Minn., assignor, by mesne assignments, to Telumigraph Company, a corporation of Minnesota Application January 9, 1932, Serial No. 585,763

7 Claims. (Cl. 177—350)

This invention relates to a machine for producing signs, as, for example, advertising signs.

An object of the invention is to provide a sign producing machine for displaying a travelling or moving word advertising sign or writing, which will consist of a plurality of composite character elements or figures arranged adjacent each other and each capable of being manipulated to selectively render discernible any one of a plurality of different letters, numbers and/or characters, and means for manipulating each of said composite character elements or figures to selectively and consecutively produce and render discernible combinations of letters, numbers and/or characters, one for each of, or a plurality of, said composite character elements or figures, each of said combinations consisting of a desired and predetermined intelligible writing or item of information constituting a component part of said travelling or moving word advertising sign or writing, and all of said intelligible writings or items of information together comprising said travelling or moving word sign or writing.

A further object is to provide a sign producing machine adapted to display an illuminated travelling or moving word sign or writing, wherein the component parts of the illuminated travelling or moving word sign or writing will be displayed step by step by consecutive advancement of said component parts across a display board, and wherein there will be a period of non-illumination of said board after each illumination thereof adapted to display a component part of said travelling or moving word sign or writing.

A further object is to provide a sign producing machine for displaying an illuminated travelling or moving word advertising sign or writing, which will consist of a plurality of composite character elements or figures arranged adjacent each other and each capable of being manipulated to selectively render discernible any one of a plurality of different illuminated letters, numbers and/or characters, and means for manipulating each of said composite character elements or figures to selectively and consecutively produce and render discernible related combinations of letters, numbers and/or characters, one for each of, or a plurality of, said composite character elements or figures, each of said combinations consisting of a desired and predetermined illuminated intelligible writing or item of information constituting a component part of said illuminated travelling or moving word advertising sign or writing, all of said illuminated intelligible writings or items of information together comprising said illuminated travelling or moving word sign or writing and being displayed step by step by consecutive advancement or progression of each illuminated intelligible writing or item of information across a display board, and there being a period of non-illumination of said board after each illumination thereof displaying a component part of said illuminated travelling or moving word sign or writing.

A further object is to provide a sign producing machine as stated, wherein each of said composite character elements or figures will consist of a plurality of separate compartments or sections adapted to be separately illuminated to be capable of rendering discernible each of said different letters, numbers and/or characters, and wherein said means for manipulating said composite character elements or figures will be a device for controlling electrical circuits for said separate compartments or sections of each of said composite character elements or figures, said device having capacity to simultaneously control all, or a plurality, of said composite character elements or figures.

And a still further object is to provide a sign producing machine of the present character, wherein will be incorporated various novel and improved features and characteristics of construction devised to simplify the structure of the machine and to render it capable of satisfactorily and efficiently and ideally performing its intended service.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, and that changes in details of construction and arrangement of parts are permissible so long as they are within the spirit of the invention and the scope of the claims which follow.

In the accompanying drawings forming a part of this specification,

Fig. 1 is an elevational view of a portion of a sign producing machine made according to the invention, showing thereon "THE STORY" constituting a part of a travelling or moving word advertising sign or writing which the machine is adapted to display;

Fig. 2 is a view similar to Fig. 1, disclosing "THE STORY B", the travelling or moving word sign or writing having advanced one step to the left;

Fig. 3 is a view similar to Fig. 2, disclosing "HE STORY BY", the travelling or moving word sign or writing having advanced an additional step to the left;

Fig. 4 is a perspective or isometric view, on a smaller scale, of the portion of the machine disclosed in Figs. 1, 2 and 3, the present view illustrating each of the composite character elements of the machine as they appear when said machine is out of use or inactive;

Fig. 5 is a view detailing several of the composite character elements or figures of the machine, partially in elevation, partially in section, and partially broken away, the sections being taken at various different locations of the several composite character elements or figures to better disclose the structure thereof;

Fig. 6 is a perspective view of a fragment of glass which may be associated with the various different composite character elements or figures;

Fig. 7 is a perspective view of a fragment of glass of different variety which may be associated with the composite character elements or figures.

Fig. 8 is a detail sectional view of the machine, taken as on line 8—8 in Fig. 9;

Fig. 9 is an enlarged elevational view, partially in section, disclosing the motor of the machine, and driving mechanism, etc., associated with said motor, the present view also detailing several other features of the machine, including the insulating member and the manner in which said insulating member is manipulated;

Fig. 10 is a detail sectional view taken as on line 10—10 in Fig. 9;

Fig. 11 is a view detailing the manner of adjustably mounting the spring contact clips;

Fig. 12 is a vertical, longitudinal sectional view constituting a continuation of the portion of the machine at the left in Fig. 9;

Fig. 13 is a detail sectional view taken as on line 13—13 in Fig. 12;

Fig. 14 is a detail sectional view taken as on line 14—14 in Fig. 12;

Fig. 15 is a vertical, longitudinal sectional view taken substantially as on line 15—15 in Fig. 8;

Fig. 16 is a vertical, transverse sectional view taken substantially as on line 16—16 in Fig. 15;

Fig. 17 is a detail sectional view taken as on line 17—17 in Fig. 15;

Fig. 18 is a detail sectional view taken as on line 18—18 in Fig. 15;

Fig. 19 is a developed view of a fragment of the insulating member;

Fig. 24 is a diagrammatic view disclosing the principle of operation of the machine.

Figure 21:
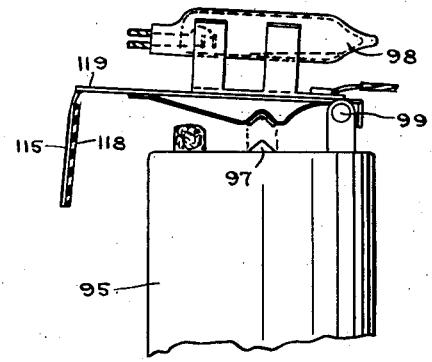
Fig. 21 is an elevational view of a portion of the device of Fig. 20, showing the parts differently positioned.

The sign producing machine of the present invention includes a plurality of duplicate units each consisting of a composite character element or figure 25, and said machine also includes means for manipulating each of said composite character elements or figures 25 to selectively and consecutively produce and render discernible combinations of letters, numbers and/or characters, each combination consisting of a desired and predetermined intelligible writing or item of information constituting a component part of a travelling or moving word advertising sign or writing which the machine is adapted to display, and all of said combinations together comprising said advertising sign or writing.

As shown in Figs. 1 to 5, the composite character elements or figures 25 are arranged adjacent each other side by side, and each of said elements or figures is capable of being manipulated to selectively render discernible any one of a plurality of different letters, numbers and/or characters. In the drawings, I have preferred to show eleven composite character elements or figures 25, but a greater or less number can obviously be utilized. As disclosed, the composite character element or figure, designated a, at the extreme left in Fig. 1 has been manipulated to show blank. The next adjacent composite character element or figure, designated b, has been manipulated to make discernible the letter T. The third composite character element or figure, designated c, shows H. The fourth, designated d, shows E. The fifth, designated e, shows blank. The sixth, designated f, shows S. The seventh, designated g, shows T. The eighth, designated h, shows O. The ninth, designated i, shows R. The tenth, designated j, shows Y. And the eleventh, designated k, shows blank. Together the composite character elements or figures 25 of Fig. 1 show simulations constituting the intelligible writing or item of information "THE STORY". Each of said composite character elements or figures 25 is capable of producing letters, numbers and characters some of which are shown in a single line at the left hand side of Fig. 19. A plurality of letters, numbers and characters can be produced by the composite character elements.

As disclosed very clearly in Figs. 5, 16 and 24, each composite character element or figure 25 consists of a frame 26 having partitions 27 dividing the frame into a plurality of separate compartments or sections 28, seventy-nine of said compartments or sections 28 each housing an electric light bulb 29. The plug of each bulb 29 is socketed in the frame 26, said frame constituting a common connector for all of the bulbs. All of the compartments or sections 28 of each composite character element or figure, seventy-nine of which house electric light bulbs, are desirably closed by a cover, or combination of covers, 30 for said composite character element or figure, which closure cover, or covers, is suitably attached to said element or figure in any convenient manner. The means for manipulating said composite character elements or figures is an automatically actuatable device 31 for controlling electrical circuits for said separate compartments or sections of each of said composite character elements or figures, and said manipulating device has capacity to simultaneously control all, or a plurality of said composite character elements or figures.

The device 31 includes a frame 32 having spaced apart bearings 33 which suitably and rotatably carry a shaft 34 upon which a conducting element or drum 35 is fixed. One end portion of the shaft 34 fixedly carries a ratchet-wheel 36 having a desired number of teeth 37 which are suitably and equidistantly disposed about said ratchet-wheel. An electric motor 38, conveniently supported upon the frame 32, has its shaft suitably geared, as indicated generally at 39, to rotate a crank disc 40, the arrangement being such that said motor can rotate said crank disc at any predetermined and desired speed. A link 41 has one of its ends pivotally attached to a crank pin 42 upon said crank disc 40, and its opposite end pivotally connected, as at 43, to a lever 44 which is rotatably mounted upon the shaft 34. A pawl 45 is pivotally supported, as at 46, upon an intermediate portion of the lever 44 in such manner as to engage the teeth 37 of the ratchet-wheel. A coil spring 47 is attached to the pawl 45 and to the lever 44 in such manner as to cause the pawl to advance the ratchet-wheel one step and to move backwardly over the teeth of said ratchet-wheel for each complete rotation of the crank disc 40, as will be understood. The crank disc 40 desirably has a plurality of holes 48 arranged at variable distances from the axis of said crank disc, any one of which holes can receive the crank pin 42, so that the throw of the link 41 can be a desired throw adapted to feed the ratchet-wheel 36, and hence the conducting element or drum 35, ahead the desired amount for each complete rotation of said crank disc. Said link 41 is desirably adjustable longitudinally, as indicated generally at 49. It will be seen that when the motor 38 is in operation, the conducting element or drum 35 will be moved ahead step by step in the direction of the arrow shown in Fig. 15, at any rate of speed which may have been predetermined. The conducting element or drum 35 will of course be insulatively mounted, and insulation will separate said drum from the crank disc 40.

An insulating member 50, which may be of fiberoid, fish or other paper, cardboard, cloth, or other suitable material, even "bakelite", if made in sections, rides over the conducting element or drum 35 to rotate therewith and be moved ahead thereby, and said insulating member 50 is provided with a plurality of spaced apart series or rows 51 of perforations, extending transversely of the insulating member, including a series or row of perforations corresponding to each one of the letters, numbers and/or characters which are to be produced or made discernible upon each composite character element or figure during the display of a travelling or moving word sign or writing. Each series or row 51 of perforations is in a single, straight line.

The electric motor 38, the conducting element or drum 35, the insulating member 50, etc., are desirably contained in a housing, denoted generally at 52, for keeping the working parts of the machine protected from the elements.

The insulating member 50 may be supported in any suitable manner to be movable over the conducting element or drum 35, as for example, by winding said insulating member upon a spool after the fashion in which a roll of paper reaches a printing office, but in the embodiment of the invention as disclosed, the insulating member is arranged in looped formation within a tapering casing 53 therefor, the present arrangement being for the purpose of conserving space. It will become evident hereinafter that the insulating member can be of any length to render the machine capable of displaying a travelling or moving word sign or writing of length almost or practically without limit. As shown more clearly in Figs. 9, 12 and 15, the insulating member assumes a natural, looped position in the tapering casing 53, which casing desirably may be arranged at one side of the conducting element or drum 35.

The conducting element or drum 35 is a guiding, as well as a feeding element for the insulating member. To this end, said conducting element or drum 35 is provided with a series of tapering pins 54 arranged adjacent each end of the cylindrical surface of said element or drum and uniformly spaced apart circumferentially about said cylindrical surface. See Figs. 10 and 15. The insulating member is provided with a row of openings 55 adjacent each side margin thereof and extending lengthwise of said insulating member which fit down over the tapering pins 54, loosely at the locations of entrance of said tapering pins into said holes 55, and snugly, or even tightly, at locations adjacent the bases of said tapering pins. Thus, said tapering pins cooperate with the conducting element or drum 35 and with the insulating member 50 to absolutely locate the various portions of the insulating member in definitely fixed relation to the conducting element or drum as said portions ride over said element or drum. The openings 55 are of course spaced apart the same distances as are the pins 54.

A support for the portion of the insulating member 50 adjacent the conducting element or drum 35 consists of an idler 56 carried by brackets 57 which are suitably supported upon an upper part of the frame 32 at opposite ends thereof, and said idler carries lugs or pins 58 adjacent its opposite end portions which also enter the openings 55 in said insulating member to assist in the guiding thereof.

The insulating member 50 is also suitably supported and guided at location adjacent the wide end of the tapering casing 53 which is opposite the conducting element or drum 35, in the manner as best shown in Figs. 12 and 13. As there disclosed, an upper idler 59 is suitably mounted upon one arm of each of bell crank levers 60 which are pivotally supported by brackets 61 carried by an upper part of the frame 32. A weight 62 upon one arm of each of the bell crank levers 60 other than the arms carrying the idler 59 is for the purpose of yieldingly urging said idler 59 upwardly against the portion of the insulating member 50 traveling thereover. The weights 62 are adjustable along the arms of the bell crank levers carrying said weights to thus adjust the force with which the idler 59 engages the insulating member. The idler 59 carries guiding lugs or pins 63 which enter the openings 55 in the insulating member in the same manner as do the lugs or pins 58 upon the idler 56. A lower idler 64 is suitably mounted upon one arm of each of bell crank levers 65 which are pivotally supported by brackets 66 carried by a lower part of the frame 32. A weight 67 upon one arm of each of the bell crank levers 65 other than the arms carrying the idler 64 is for the purpose of yieldingly urging said idler 64 downwardly against the portion of the insulating member 50 travelling thereover. The weights 67 are also adjustable along the arms of the bell crank levers carrying said weights to thus adjust the force with which the idler 64 engages the insulating member. The idler 64 also carries guiding lugs or pins 68 which enter the openings 55 in the insulating member in the same manner as do the lugs or pins 58 upon the idler 56 and the lugs or pins 63 upon the idler 59.

The direction of feed of the insulating member 50 is indicated by the arrows in Figs. 9, 12, and 15, said insulating member travelling from the idler 56 to the conducting element or drum 35, thence into the adjacent, smaller end of the tapering casing 53, thence out of the larger end of said tapering casing, thence over the idler 64, and thence over the idler 59 to the idler 56. The portion of the length of the insulating member 50 between the idler 56 and the conducting element or drum 35 passes downwardly about a plain idler 69 which is suitably mounted in the frame 32 adjacent said conducting element or drum 35. See Fig. 15.

Upon its passage from the conducting element or drum 35 into the adjacent, smaller end of the tapering casing 53, the insulating member is stripped from said conducting element or drum and is guided into said tapering casing in the manner which will be more clear from Figs. 15, 17 and 18. A stripper element for the insulating member 50 is denoted 70 and constitutes the upper wall of a guiding element the lower wall of which is designated 71. The members 70 and 71 are spaced apart a suitable distance, slightly greater than the thickness of the insulating member 50, and side walls of the guiding element, conveniently constituted by portions of the frame 32 complete the structure of said guiding element. The lower wall 71 has its end portion opposite the tapering casing 53 arranged to extend beyond the stripper element 70 and slightly past the lower part of the conducting element or drum 35, said lower wall 71 being suitably supported by brackets 72 upon the frame 32. The outer or stripping end of the stripper element 70 lies closely adjacent the conducting element or drum 35, in stripping position relatively to the insulating member and said element or drum. The inner end portions of the members 70 and 71 enter the adjacent end of the tapering casing 53 as denoted generally at 73, and are associated with said casing in any convenient manner, the assembly as shown in Fig. 15 being satisfactory. The end wall of the tapering casing 53 at the larger end of said casing, opposite the conducting element or drum 35, is indicated 74, and is provided with a suitable guide slot 75 which is arranged across the lower portion of said end wall 74. The guide slot 75 can be constructed in any convenient manner, the arrangement as disclosed in Figs. 12 and 14 being satisfactory.

It will be evident that upon step by step rotation of the conducting element or drum 35, the insulating member 50 will be stripped from said element or drum by the stripper element 70, and the guiding element, consisting of the members 70 and 71, will hold said insulating member 50 flat and cause it to be fed into the adjacent, smaller end of the tapering casing 53 in the manner best shown in Fig. 15. Here the insulating member will arrange itself, naturally, into the upwardly and downwardly extending folds better shown in Figs. 9, 12 and 15, the folds increasing slightly in magnitude as they approach the larger end of the tapering casing 53, but in no way cramming or hindering the feeding or pushing ahead of the insulating member through said tapering casing, which feeding or pushing ahead is accomplished by advancement or rotation of the conducting element or drum 35. At the larger end of the tapering casing 53, the insulating member is removed bit by bit from said tapering casing and made to travel upwardly over the idlers 64 and 59 by a very slight pull which it is necessary for the conducting element or drum 35 to exert, as will be evident. Preferably, the tapering casing 53 slants downwardly slightly from its smaller to its larger end, so that gravity can assist in the feed of the insulating member 50 through said tapering casing. It has been found that by employing a desirably tapering casing and providing for looping of the insulating member 50 in the manner as illustrated, an insulating member of great length can be utilized in a machine of the present character of relatively small size. That is to say, were the insulating member rolled upon a spool and fed therefrom to the conducting element or drum 35, or handled in some other possible manner, considerably more space in the machine would be required to handle an insulating member of the same length than is required when an arrangement substantially as set forth is employed.

Panels 76, desirably of insulating material, including a panel 76 for each composite character element or figure 25, are conveniently supported upon the frame 32, in the manner to be presently described, adjacent or above the conducting element or drum 35, and each panel 76 suitably supports a plurality of spaced apart spring contact clips 77, including a separate contact clip 77 for each lamp bulb 29 of a corresponding composite character element or figure 25. A separate lead wire 78 extends between each contact clip 77 of each panel 76 and the plug of a corresponding lamp bulb of the corresponding composite character element or figure 25, as will be understood.

The contact clips 77 upon each panel 76 may desirably be attached to the panel by passage of the contact clips through said panel, as shown more clearly in Figs. 15, 16 and 24, the association of the contact clips with the panels being made in such manner that the portions of the contact clips passing through the panels will be fixedly located therein, as for example, by flattening said portions of the contact clips. Each contact clip 77 is desirably provided with a bend 79, and the outer ends of all of the contact clips of each set of contact clips are disposed in a single, straight line and are spaced apart to collectively engage the conducting element or drum 35, or the insulating member 50, as the case may be at a particular time, for approximately a trifle less than the entire widths of said conducting element or drum and said insulating member, as will be evident from Figs. 15, 16 and 24. Insulating contact clip spacing members 80, carried by the frame 32 at 81 and including as many spacing members plus one as there are contact clips to each set, or carried by each panel 76, separate corresponding contact clips of each different set from adjacent contact clips of the same set, as will be more apparent from Figs. 15 and 16.

The various letters, numbers and characters which any composite character element or figure 25 of the sign producing machine is capable of providing are each produced or made discernible, in the embodiment of the invention disclosed, by energizing a plurality of bulbs 29 to illuminate corresponding compartments or sections 28. That is to say, the compartments or sections 28 to be illuminated by lighting the bulbs 29 have predetermined configuration and relation to each other making it possible to illuminate a selected combination of compartments or sections 28 which when illuminated will simulate any selected one of the letters of the alphabet, any selected one of the numbers 0 to 9, or any selected one of various characters, all as hereinbefore specifically mentioned.

Each different series or row 51 of perforations in the insulating member 50 corresponds to a letter, number or character adapted to be displayed successively upon each composite character element or figure 25, and the plurality of series or rows 51 of perforations constitute spaced apart lines or rows of perforations each of which extends transversely of said insulating member, all of the lines or rows together approximately consuming the whole length of the insulating member, as suggested in Fig. 19.

The spring contact clips 77 are, by reason of their resiliency and by reason of the bends 79 therein, which bends are in direction toward the conducting element or drum 35, urged in direction toward the insulating member 50 and said conducting element or drum so that the outer or lower end portions of the different sets of spring contact clips can yieldingly engage said insulating member and said conducting element or drum in about the manner as best disclosed in Figs. 15, 16 and 24.

The different sets, eleven sets as disclosed, of contact clips 77 are spaced apart the same distances as are the lines or rows 51 of perforations in the insulating member 50, and the electric motor 38 is adapted to advance the conducting element or drum 35 in such manner that eleven lines or rows 51 of perforations can at all times when the element or drum 35 is stationary be directly beneath said eleven sets of contact clips, and so that the next succeeding line or row 51 of perforations will move to the set of contact clips next in advance upon each actuation of said conducting element or drum, a line or row 51 of perforations moving clear of the set of contact clips at the extreme right and a line or row 51 of perforations moving to the set of contact clips at the extreme left in Fig. 15 upon each actuation of the conducting element or drum 35.

The perforations of each series or row 51 of the plurality of series or rows of perforations in the insulating member 50 are spaced apart, transversely of said insulating member, to agree with the spacing apart of the contact clips of each set carried by a panel 76, the arrangement being such that when a particular series or row 51 of perforations is beneath the contact clips 77 of a set, certain of the contact clips of said set which are alined with perforations will engage the conducting element or drum 35, by reason of the resiliency of the contact clips, while others of said resilient contact clips, beneath which there are at the time no perforations, will yieldingly rest upon the portion of the insulating member 50 over said element or drum 35 and beneath the contact clips. In other words, the insulating member 50 is of at least sufficient width so that as many as seventy-nine perforations, one perforation corresponding to each contact clip 77 of each set, can constitute a single series or row of perforations, such as 51, arranged across said insulating member, and in such a series or row 51 containing seventy-nine perforations, said perforations would be spaced apart precisely the same distances as are the outer or lower end portions of the contact clips 77 of each set, so that were said series or row 51 of seventy-nine perforations placed directly in alinement with said outer or lower portions of the contact clips of a set, each and all of said portions would separately enter perforations and engage the conducting element or drum 35 to cause all of the seventy-nine lamp bulbs 29 of the corresponding composite character element or figure to be lighted, in the manner to be presently set forth. It is of course necessary to illuminate a number of lamp bulbs 29 less than the total number present in any composite character element or figure 25 to produce and make visible each of the several different letters, numbers and characters which each composite character element or figure of the machine is capable of providing, and the perforations of each series or row 51 of perforations are, in the instance of each letter, number and character of each composite character element or figure to be produced, precisely those allowing the outer or lower portions of the contact clips of the corresponding set of contact clips adapted to energize the specific lamp bulbs 29 for illuminating the appropriate combination of compartments or sections 28 which when illuminated will simulate the corresponding letter, number or character of the corresponding composite character element or figure to engage the conducting element or drum 35, as will be understood.

The machine includes an arrangement for insuring that all of the spring contact clips 77 of each set can be nicely adjusted with respect to the conducting element or drum 35, whereby to provide proper and satisfactory electrical engagement between said conducting element or drum and said contact clips through the perforations of each series or row 51 of perforations. To accomplish this result, the opposite end portions of each insulating panel 76 are carried by brackets 82 rotatably mounted upon the frame 32 as at 83, a screw in each bracket being for the purpose of fixing the bracket relatively to the frame. It will be apparent that by rotation of the brackets 82 upon their axes 83, the outer or lower ends of the contact clips of each set can be moved further toward or further away from the conducting element or drum 35. Upon fixing the adjusted brackets relatively to the frame 32, the pressure with which the contact clips wipe over the insulating member 50 is evidently adjustably set. The bend 79 in each contact clip 77 obviously assists in accomplishing the desired result, and any contact clip which may have tendency to get out of its fixed position can be adjusted back to position by manipulation of said contact clip at its bend 79, as will be understood. It may be that in some particular case the adjustment of a set of contact clips 77 by manipulation of the brackets 82 in the manner as set forth might remove the contact clips of a set from the desired and proper position with respect to the various lines or rows 51 of perforations as these are intended to position themselves under the contact clips of each set. The machine includes additional means for adjusting each set of contact clips to overcome any such difficulty. As shown more clearly in Figs. 9, 11 and 15, each panel 76 is attached to each bracket supporting said panel by means of small screws 84, one near the front and one near the rear adjacent each end of the panel, which screws 84 pass downwardly through the panels and enter the brackets. A small washer 85 upon a forward or rearward screw, as the case may be, at each end of the corresponding panel and between the panel and supporting bracket provides filler means for moving the panel to a receded or elevated position when this is the situation to be desired. The washers or filler means 85 can be of any thickness suitable to the condition at hand. It will be at once evident that when the washers or filler means are about the screws 84 at the left as shown in Fig. 9 of the drawings, additional pressure of the corresponding contact clips 77 against the insulating member 50 and the conducting element or drum 35 can be applied by turning the screws 84 at the right into the corresponding brackets 82, whereas when the washers or filler means 85 are upon the screws 84 at the right, as in Figs. 11 and 15, the pressure of the corresponding contact clips against the insulating member and the conducting element or drum can be decreased by turning the screws 84 at the left down into the brackets. Thus, provision is made for very nice adjustments of the contact clips of each set to make it certain that each contact clip can engage the insulating member 50 and the conducting element or drum 35 is precisely the manner desired and best suited to enhance the operation of the machine. Desirably, each panel 76 has the length thereof reinforced by a metallic strip 86 extending longitudinally of the panel and attached thereto in any convenient manner.

Attention is called to the fact that while I have preferred to illustrate the element 35 as a drum and the member 50 as a sheet or belt, said element 35 and said member 50 need not necessarily be of the configuration or structure shown. The former might in some instances as well be a conducting entity of any suitable and convenient type different from that illustrated, and the latter might in some instances as well be an insulating entity modified to be operative with the particular conducting entity employed, either movable with said conducting entity, as hereinbefore described, or movable over or relatively to the conducting entity. For example, the conducting element 35 could be a supporting surface or table, and the insulating member 50 could be movable with or over said surface or table and beneath the contact clips 77, either as a perforated belt, perforated strip, or even as a perforated cylinder.

Each electric lamp bulb 29 of each of the composite character elements or figures 25 is in a separate electrical circuit which includes one of the contact clips 77 and one of the lead wires 78 of a set of lead wires and contact clips carried by the corresponding insulating panel 76. Referring to Fig. 24, a transformer 87 includes a primary 88 and a secondary 89. Relatively heavy lead wires 90 extend from one side of the secondary of said transformer and include a lead wire 90 connected with the conducting or connector frame 26 of each composite character element or figure 25 of the sign producing machine as indicated at 91 in Fig. 16. Also, a relatively heavy lead wire 92 extends from the other side of said secondary and is suitably connected with a buss bar 93 which is in turn electrically connected with a contact element or brush 94 which wipes the conducting element or drum 35. So that a circuit from any of the lamp bulbs 29 of any one of the composite character elements or figures 25 is traced from the secondary of the transformer 87 through the appropriate lead wire 90 to the conducting or connector frame 26 of the corresponding composite character element or figure, thence to any lamp bulb 29 of said corresponding character element or figure, thence through the corresponding lead wire 78 and the corresponding contact clip 77 of the corresponding set of contact clips, thence through the conducting element or drum 35, thence through the contact element or brush 94, thence through the buss bar 93, and thence through the lead wire 92 back to the secondary of the transformer. Clearly, none of the lamps 29 of any one of the composite character elements or figures will be illuminated when none of the contact clips 77 of the corresponding set of contact clips is in engagement with the conducting element or drum 35, and for each of said contact clips 77 allowed to engage said conducting element or drum 35, there will be a corresponding lamp 29 of the corresponding composite character element or figure 25 illuminated.

Referring again to Fig. 1 of the drawings, this time in connection with Figs. 15, 16, 19 and 24, but more particularly in connection with said Fig. 15 where the set of contact clips corresponding to the composite character element or figure *a* in Fig. 1 has also been marked *a*, the set corresponding to *b* marked *b*, etc., it will be seen that the set *a* of contact clips is positioned on the insulating member to provide blank shown at *a* in Fig. 1, there being no series or row 51 of perforations beneath said set *a* of contact clips. The set *b* of contact clips is over a series or row 51 of perforations corresponding to the letter T shown at *b* in Fig. 1. The set *c* of contact clips is over a series or row 51 of perforations corresponding to the letter H shown at *c* in Fig. 1. The set *d* of contact clips is over a series or row 51 of perforations corresponding to the letter E shown at *d* in Fig. 1. The set *e* of contact clips is positioned on the insulating member to provide blank shown at *e* in Fig. 1, there being no series or row 51 of perforations beneath said set *e* of contact clips. The set *f* of contact clips is over a series or row 51 of perforations corresponding to the letter S shown at *f* in Fig. 1. The set *g* of contact clips is over a series or row 51 of perforations corresponding to T shown at *g* in Fig. 1. The set *h* of contact clips is over a series or row 51 of perforations corresponding to O shown at *h* in Fig. 1. The set *i* of contact clips is over a series or row 51 of perforations corresponding to R shown at *i* in Fig. 1. The set *j* of contact clips is over a series or row 51 of perforations corresponding to Y shown at *j* in Fig. 1. The set *k* of contact clips is positioned on the insulating member to provide blank shown at *k* in Fig. 1, there being no series or row 51 of perforations beneath said set *k* of contact clips. In this connection see Fig. 19 a part of which shows a developed view of the lines or rows 51 of perforations corresponding to "THE STORY". In Fig. 2 of the drawings, the letter T at *b* has advanced one step to *a*, H has advanced from *c* to *b*, E from *d* to *c*, blank from *e* to *d*, S from *f* to *e*, T from *g* to *f*, O from *h* to *g*, R from *i* to *h*, Y from *j* to *i*, blank from *k* to *j*, and B has advanced to be discernible at *k*. In Fig. 3 the advance has been repeated the next, or a second, step, and "HE STORY BY" appears on the display board. It will be apparent that this advance from Fig. 1 to Fig. 3 was accomplished by step by step rotation or feeding ahead of the conducting element or drum 35 which carried along with it the insulating member 50 to cause the lines or rows 51 of perforations which where under the sets *a*, *b*, *c*, *d*, *e*, *f*, *g*, *h*, *i*, *j*, and *k* respectively to move ahead the first step moving the line or row 51 of perforations which was under set *a* to the right of *a* in Fig. 15 and moving the line or row or perforations which was under set *b* to *a*, and so on, and the next or second step moving the line or row 51 of perforations which moved to set *a* during the firsts step to position beyond set *a*, and the next succeeding line or row 51 of perforations to set *a*, and so on. Naturally, when each line or row 51 of perforations moves to the right beyond the set *a* of contact clips, a new line or row of perforations moves beneath the set *k* of contact clips. Obviously, the display board shown in Figs. 1 to 4 might be lengthened or shortened to any desired extent by the addition or subtraction of composite character elements or figures, and the operating device of the machine will include a set of contact clips, such as a, b, c, etc., corresponding to each composite character element or figure employed.

In the operation of the machine in practice, the conducting element or drum 35 will be intermittently rotated ahead desirably at a uniform rate of speed so that, preferably, the break between illuminations of the board, which illuminations provide the component parts of the sign or writing, will be sufficiently short to make it impossible for the human eye to discern that the board has a period of non-illumination after each said illumination thereof displaying a component part of said illuminated travelling or moving word sign or writing. It will be evident that the board will be non-illuminated at each period of advance of the conducting element or drum 35, while the sets of contact clips 77 are positioned upon the insulating member 50 between lines or rows 51 of perforations as said insulating member moves ahead, but when these periods of non-illumination of the board are predeterminedly made quite short, the human eye is, by actual test of the machine in operation, unable to discern a break in the flow of light from the display board, but only sees the component parts of the sign follow each other across the board, from right to left, in unceasing, continuous and uniform manner. The duration of time each component part of an advertising sign or writing will remain illuminated, and the duration of time of non-illuminations of the display board between the displays of the component parts of said advertising sign or writing, will preferably be such, in the instance of a particular travelling or moving word advertising sign or writing, as to insure that the sign or writing will appear to move ahead smoothly and continuously and at a predetermined rate of speed, without any unevenness or jumpiness, to give the illusion of the letters, numbers and/or characters of the sign simply appearing one after another and travelling or moving across the display board, from right to left.

Particular attention is, however, called to the fact that by provision of the periods of non-illumination of the board after each illumination thereof adapted to display a component part of a travelling or moving word sign or writing, there can be no trail or tails of light between the display of the various parts going to make up the travelling or moving word sign or writing, as is the case in the instance of various travelling or moving advertising signs heretofore of commerce. A quite important feature of the present invention is the production of a travelling or moving word sign or writing by employment of the quite simple mechanisms as illustrated and described, and without the presence, during the operation of the device, of trailing tails or flashes of light which have heretofore ordinarily had detrimental effect upon moving advertising signs.

In some instances it may be desirable to temporarily cease the operation of the machine, either while a component part of a travelling or moving word sign or writing is visible or while the display board is non-illuminated, and to have the machine thereafter continue its operation in normal manner as already hereinbefore described. To this end, the machine includes a magnetically-thermostatically actuated device 95 shown more clearly in Figs. 20, 21, 22 and 24. Also, the machine has provision for rendering impossible the display of any of the letters, numbers and/or characters of any of the composite character elements or figures should the insulating member 50 become broken. To the accomplishment of this end, said machine includes a magnetically actuated device 96, shown more clearly in Figs. 23 and 24.

The magnetically-thermostatically actuated device 95 includes a magnet having an armature 97 which is adapted to become protruded from said magnet upon energization thereof. A mercury switch 98 is pivotally supported upon the device 95 as at 99, at position adjacent the armature 97. The arrangement is such that when the mercury switch 98 is in horizontal position as in Fig. 20, the contacts thereof are closed, but when said mercury switch is tilted as in Fig. 21 its contacts are broken, and the armature 97 is adapted to cause said mercury switch 98 to be tilted when the magnet having said armature is energized.

With more particular reference to Fig. 24, it should be here mentioned that one of the insulating panels 76 supports a suitable contact clip 100, and that the insulating member 50 includes perforations 101 (also shown in Fig. 19) at any desired locations along the length thereof and in longitudinal alinement with the contact clip 100. It is only when a perforation 101 rides under the contact clip 100 that the magnetically-thermostatically actuated device 95 is operated to stop the advance of the motor.

A lead wire 102 extends from one side of the secondary of the transformer 87 to a terminal 103, and a lead wire 104 extends from said terminal 103 to the magnet of the device 95. A lead wire 105 extends from said magnet to a terminal 106, and a lead wire 107 extends from said terminal 106 to the contact clip 100. It will be apparent that whenever the contact clip 100 is riding upon the insulating member 50, there will be no current through the magnet of the device 95, but when a perforation 101 rides under said contact clip 100, the magnet of said device 95 will be energized, the circuit through said magnet being traced from the secondary of the transformer 87 through the lead wire 102 to the terminal 103, thence through the lead wire 104 to said magnet of the device 95, thence through the lead wire 105 to the terminal 106, thence through the lead wire 107 to the contact clip 100, and thence through the conducting element or drum 35, the brush 94, the bus bar 93, and the lead wire 92 back to the secondary of the transformer.

Means will of course be provided for manually making and breaking the electrical circuit for the motor 38. Also, the circuit for said motor 38 includes the mercury switch 98. A lead wire 108 extends from the primary of the transformer 87 to a terminal 109, a lead wire 110 extends from said terminal 109 to said mercury switch 98, a lead wire 111 extends from said mercury switch to a terminal 112, a lead wire 113 extends from said terminal 112 to the motor 38, and a lead wire 114 extends from said motor back to the primary of said transformer. Evidently, by energization of the magnet of the device 95 and the consequent tilting of the mercury switch 98 to break the contacts thereof, the motor will be de-energized, and this will be so whether or not the machine is positioned to allow a display to remain discernible upon the board, it being evident that the breaking of the motor circuit in the manner as set forth in no way affects the supply of electrical current to the composite character elements or figures of the board for the lighting of the lamps thereof.

Numeral 115 represents a bimetallic thermostatic element suitably supported upon the device 95 at 116, and 117 represents a truing apparatus for said bimetallic strip. The upper end portion of said bimetallic strip 115, or of an extension thereof, has insulation 118 upon the surface thereof arranged adjacent a conducting element 119 associated with the part of the mercury switch 98 which is pivoted upon the device 95. A lead wire 120 is attached to said conducting element 119 and to a terminal 121. A lead wire 122 is attached to a resistance element 123 about the bimetallic strip 115 and to said bimetallic strip, and said bimetallic strip is itself a conductor of electricity. A terminal for the lead wire 122 is denoted 124. A lead wire 125 extends from the lead wire 102 to the terminal 124, and a lead wire 126 extends from the terminal 121 to the lead wire 92.

Figure 20:
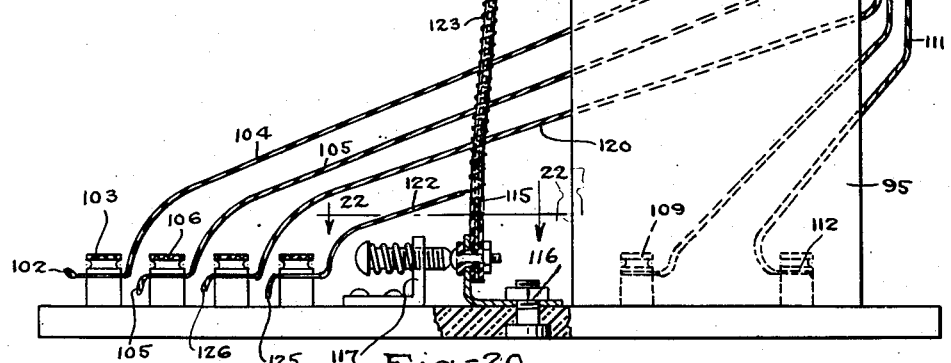
Fig. 20 is an enlarged elevational view, partially in section and partially broken away, of a magnetically-thermostatically actuated device of the machine.
Figure 22:
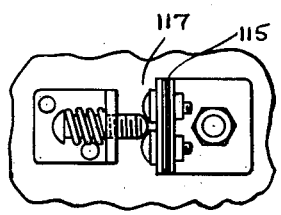
Fig. 22 is a detail sectional view taken as on line 22—22 in Fig. 20.

The bimetallic strip 115 is adapted to be, when cold, resiliently urged against the outer end of the conducting element 119 when this is in normal position as in Figs. 20 and 24 and the motor 38 is in operation. Upon the entry of the contact clip 100 into a perforation 101 to energize the magnet of the device 95 to cause its armature 97 to tilt the mercury switch 98 and the conducting element 119 upwardly to position the free end of said conducting element 119 clear of the insulation 118 and above said bimetallic strip, the bimetallic strip moves under the outer end portion of the conducting element 119, by reason of the condition and the resilient nature of said bimetallic strip, to bring said conducting element 119 and bimetallic strip 115 into contacting engagement as shown in Fig. 21 upon de-energization of the magnet to release said armature 97. The motor 38 does not come to a full stop, as will be obvious, until the perforation 101 which was entered by the contact clip 100 has moved clear of said contact clip, this being due to the momentum of said motor. But before the magnet of the device 95 is de-energized, by movement of the perforation 101 from the contact clip 100, to allow the armature 97, the mercury switch 98 and the conducting element 119 to fall by gravity to normal positions, the bimetallic strip 115 has moved from its location as in Fig. 20 to its location as in Fig. 21, to thus arrest said mercury switch 98 and said conducting element 119 in the tilted position as shown, with the contacts of said mercury switch 98 broken. Upon engagement of the conducting element 119 and the bimetallic strip 115 with each other, as in said Fig. 21, a circuit is completed through the resistance element 123 to cause said bimetallic strip 115 to be heated and the upper or outer end portion thereof in time, as a consequence, to move outwardly from the conducting element 119, toward the left in Fig. 21, to thus allow the mercury switch 98 and said conducting element 119 to fall to normal position, as in Fig. 20, the armature 97 at this time, obviously, being in receded or lowered position. It will of course take a little while for the resistance element 123 to distort the bimetallic strip 115 to cause said bimetallic strip or an extension thereof to release the conducting element 119, and during this time the motor 38 will be inoperative. Upon the breaking of the circuit through the bimetallic strip, this will quickly cool off and return to position as in said Fig. 20. The composite character elements or figures 25 may remain illuminated or non-illuminated when the motor 38 is inoperative, depending upon what was before predetermined; that is to say, depending upon whether or not contact clips 77 are over perforations of the series or rows 51 when the motor 38 comes to a complete stop. The circuit through said resistance element 123 is traced from the secondary of the transformer 87 through the lead wires 102 and 125 to the terminal 124, thence through the lead wire 122, the resistance element 123, and the bimetallic strip 115 to the conducting element 119, thence through the lead wire 120 to the terminal 121, and thence through the lead wire 126 and the lead wire 92 back to the secondary of the transformer.

The magnetically actuated device 96 includes a magnet having an armature 127 which is adapted to become protruded from said magnet upon energization thereof. A mercury switch 128 is pivotally supported upon the device 96 as at 129, at position adjacent the armature 127. The arrangement is such that when the mercury switch 128 is in horizontal position as in Fig. 23, the contacts thereof are closed, but when said mercury switch is tilted upwardly its contacts are broken, and the armature 127 is adapted to cause said mercury switch 128 to be tilted upwardly when the magnet having said armature is energized.

With more particular reference to Fig. 24, it should be here mentioned that each of the insulating panels 76 supports a suitable contact clip 130, said contact clips 130 being adapted to ride over a longitudinal line of the insulating member 50 which is without any perforations. It is only when said insulating member 50 breaks to allow one or more of the contact clips 130 to engage the conducting element or drum 35 that the magnetically actuated device 96 is operated to render impossible the display of any of the letters, numbers and/or characters of any of the composite character elements or figures 25. Operation of the device 96 breaks the main circuit supply and renders the whole machine, including the motor 38 and the lights, dead.

A lead wire 131 extends from the lead wire 102 to a terminal 132, and a lead wire 133 extends from said terminal 132 to the magnet of the device 96. A lead wire 134 extends from said magnet to a terminal 135, and a lead wire 136 extends from said terminal 135 to each of lead wires 137, including a lead wire 137 attached to the contact clip 130 supported by each panel 76. It will be apparent that whenever all of the contact clips 130 are riding upon the insulating member 50, there will be no current through the magnet of the device 96, but when said insulating member 50 becomes broken to allow one or more of the contact clips 130 to engage the conducting element or drum 35, the magnet of said device 96 will be energized, the circuit through said magnet being traced from the secondary of the transformer 87 through the lead wires 102 and 131 to the terminal 132, thence through the lead wire 133 to said magnet of the device 96, thence through the lead wire 134 to the terminal 135, thence through the lead wire 136 and the appropriate one of the lead wires 137 to a contact 130 engaging the conducting element or drum 35, and thence through said conducting element or drum, the brush 94, the bus bar 93, and the lead wire 92 back to the secondary of the transformer.

The mercury switch 128 is connected across the incoming lead wires from a source of electrical supply at location in advance of the primary of the transformer 87, and arrangement being such that when the contacts of said mercury switch 128 are broken there will be no electrical power supplied to the motor 38 or to said transformer, and hence no electrical energy to drive the element or drum 35 or to illuminate the lamps of any of the composite character elements or figures 25. As disclosed, one side of the primary 88 of the transformer, the side which has the lead wire 114, is in direct connection with the source of current supply, while the other side of said primary 88 is in connection with said source of supply by means of a lead wire 138 extending to a terminal 139, a lead wire 140 extending from said terminal 139 to the mercury switch 128, a lead wire 141 extending from said mercury switch 128 to a terminal 142, and a lead wire 143 between said terminal 142 and said source. Evidently, by energization of the magnet of the device 96 and the consequent tilting of the mercury switch 128 to break the contacts thereof, the supply of electrical current to the transformer 87, the motor 38, the lamps of all of the composite character elements or figures, etc., will be cut off and the whole machine will be dead.

Numeral 144 represents a resilient strip or bar suitably supported upon the device 96 at 145 and having its upper end portion arranged against the outer or free end of a cooperating strip or bar 146 associated with the part of the mercury switch 128 which is pivoted upon said device 96.

Figure 23:
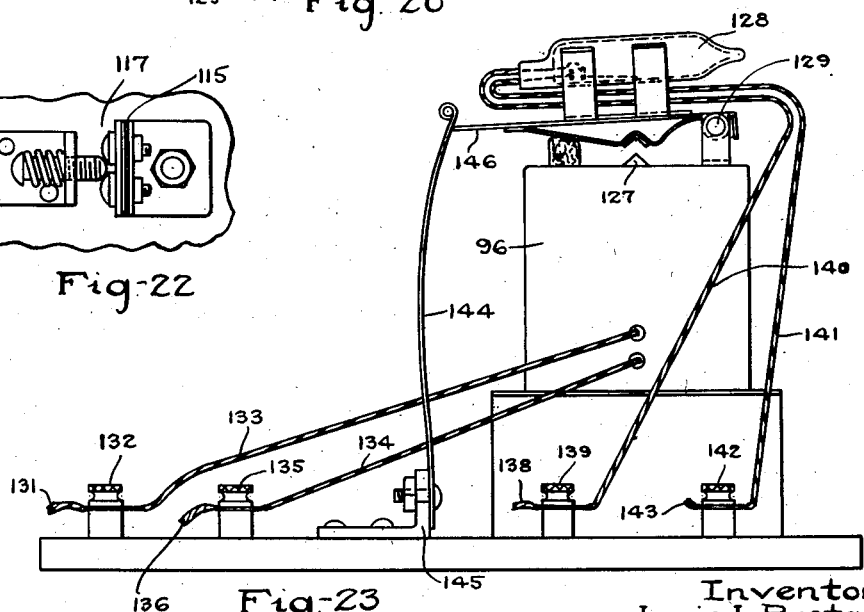
Fig. 23 is an enlarged elevational view of a magnetically actuated device of the machine.

The resilient strip or bar 144 is normally urged against the outer or free end of the cooperating strip or bar 146 when this is in normal position as in Figs. 23 and 24 and the motor 38 is in operation. Upon the breaking of the insulating member 50 so that one or more of the contact clips 130 engage the conducting element or drum 35 to energize the magnet of the device 96 to cause its armature 127 to tilt the mercury switch 128 and the strip or bar 146 upwardly to position the free end of said strip or bar 146 clear of the upper end of the resilient strip or bar 144, said resilient strip or bar 144 moves under the outer or free end portion of said strip or bar 146, to thus hold the contacts of the mercury switch 128 broken, and to, as a consequence, hold the supply circuit broken until said resilient strip or bar 144 is manually manipulated to its normal position as shown in Fig. 23 to permit the strip or bar 146 and the mercury switch 128 to fall by gravity to normal positions and thus allow the machine to be again operative, provided the insulating member 50 has been repaired or replaced. It will be evident that when the mercury switch 128 is in tilted position to break the circuit at the incoming line wires leading to the transformer 87, and to the motor 38, the whole machine will be dead, and that said transformer 87 and motor 38 will be energized to render the machine again operative upon the falling by gravity of said mercury switch 128 to position causing its contacts to be closed, it being assumed that none of the contact clips 130 will at this time be in engagement with the conducting element or drum 35.

In Figs. 5, 6, 7 and 16, I have illustrated structure capable of producing several different illuminating effects in connection with each of the composite character elements or figures 25. In Fig. 6 there is disclosed a fragment of a pane of glass which can supply a cover 30 for the separate compartments or sections of each composite character element or figure 25, said pane of glass including an uneven surface or uneven surfaces 147. Such a pane of glass makes provision for the diffusion of light emanating from the various lamps or bulbs, causes letters, numbers and characters to be displayed which appear to be embossed, and allows the outer edges of the partitions 27 of the frame 26 to be definitely visible through the glass. In Fig. 7 there is disclosed a fragment of a pane of glass which can supply a cover 30 for the separate compartments or sections of each composite character element or figure 25, said pane of glass having a cloudy or milky-like area or coating 148 upon one of its surfaces. Such a pane of glass also makes provision for the diffusion of light emanating from the lamps or bulbs, and when the cloudy, milky-like area or coating is at the outer side of the glass, or otherwise suitably positioned relatively to a composite character element or figure 25, the diffusion of the light from the lamps or bulbs is increased and the outer edges of the partitions 27 between the compartments or sections 28 of the frame 26 can, by a proper arrangement, be made to disappear altogether, provided there are lighted lamps at opposite sides of a partition. The partitions of course define the outer margins of the letters, numbers and/or characters to make these clean cut and sharp. In some cases when the lines constituted by the edges of the partitions 27 of the compartments or sections 28 are to be made to disappear, the surfaces 149 of said partitions may be made to slant slightly outwardly from the general location of the lamps or bulbs to the outer, forward edge portions of the frame 26, as shown more clearly in Fig. 16, said surfaces 149 making obtuse angles with the base of the corresponding frame 26. Such an arrangement can be made to better diffuse the rays of light which are reflected by said surfaces 149 so that said rays can better assist in rendering said partitions invisible, as will be understood.

In Fig. 16 I have shown the composite character element or figure 25 which is there disclosed as provided with a cover 30 consisting of a double pane including the one of Fig. 7 at the inner side of the cover and the one of Fig. 6 at the outer side of said cover, the milky or cloudy irradiant surface 148 of the glass of Fig. 7 being adjacent the glass of Fig. 6 and opposite the lamps or bulbs 29, and the uneven surface 147 of the glass of Fig. 6 being at the outer or front side of the composite character element or figure. When such a lighting arrangement is employed and the outer glass is of amber color and the inner glass is of relatively lighter color and has a milky-like area, the resulting color of the light produced is evenly toned, evenly diffused and restful to the eye being devoid of glaring rays. All of the advantageous features of both of the glasses of Figs. 6 and 7 are preserved when used together, the amount of diffusion is greatly increased, and a vivid, golden, fire-like, luminous and warm color emanates from the written entity or lighted compartments or sections of the composite character element or figure 25. The definite effect of the use of the combination of glasses of Figs. 6 and 7, in addition to the improved lighting effect, is that the sides or edges of the compartments or sections meet in continuous lines to form perfect letters, numbers and/or characters with sharp and clear edges which are not indeterminable or shaded, but appear to be clean cut and well defined.

What I claim is:
1. In an electrical sign, a traveling sheet per- forated in columns, each column being appropriated for the representation of a single character and containing perforations arranged singly or in predetermined combinations, a series of character representing units each consisting of a set of luminous units one for each possible perforation in a column, a plurality of sets of circuits, one set for each character representing unit, means for causing said circuits to be closed through the columns of perforations to cause the simultaneous illumination of the sets of luminous units, and means for thereafter causing the sheet to be stepped the distance of one column to operatively correlate other columns with the sets of luminous units.

2. In an electrical sign, a traveling sheet perforated in columns, each column being appropriated for the representation of a single character and containing perforations arranged singly or in predetermined combinations, a series of character representing units each consisting of a set of luminous elements, a plurality of sets of circuits, one set for each character representing unit, and one circuit for each luminous element, means for causing said circuits to be closed through the instrumentality of the columns of perforations to cause the simultaneous illumination of the sets of luminous elements, and means for thereafter causing the sheet to be stepped the distance of one column to operatively correlate perforations of other columns with the sets of luminous elements.

3. In an electrical sign, a traveling sheet perforated in columns, each column being appropriated for the representation of a single character, a series of character representing units each consisting of a set of independent luminous elements, a set of circuits for each character representing unit, each set including a circuit for each luminous element, means for causing said circuits to be closed through the instrumentality of the columns of perforations to cause the simultaneous illumination of the sets of luminous elements, and means for causing the sheet to be stepped the distance of one column to operatively correlate perforations of other columns with the sets of luminous elements.

4. In a traveling sign wherein the characters appear to travel from one end to the other, the combination of a sign board comprising a plurality of composite character elements arranged adjacent each other and each having means capable of being manipulated to selectively render discernible upon each of said composite character elements any one of a plurality of different illuminated intelligible characters, and means for manipulating each of said composite character elements to selectively cause each composite element to display therein a selected character and to successively cause each composite element to display at each manipulation thereof only the complete character last displayed by the immediately preceding composite element, said means causing all of the composite elements to be in non-display condition before each transfer of display from one element to the next succeeding element.

5. In an electrical sign, a traveling sheet having circuit controlling means arranged in columns, each column being appropriated for the representation of a single character and containing circuit controlling means arranged singly or in predetermined combinations, a series of character representing units each consisting of a set of luminous units one for each possible circuit controlling means in a column, a plurality of sets of circuits, one set for each character representing unit, means for causing said circuits to be closed through the columns of circuit controlling means to cause the simultaneous illumination of the sets of luminous units, and means for thereafter causing the sheet to be stepped the distance of one column to operatively correlate other columns with the sets of luminous units.

6. In an electrical sign, a traveling sheet having circuit controlling means arranged in columns, each column being appropriated for the representation of a single character, a series of character representing unit each consisting of a set of independent luminous elements, a set of circuits for each character representing unit, each set including a circuit for each luminous element, means for causing said circuits to be closed through the instrumentality of the columns of circuit controlling means to cause the simultaneous illumination of the sets of luminous elements, and means for causing the sheet to be stepped the distance of one column to operatively correlate other columns with the sets of luminous elements.

7. In an electrical sign, a traveling sheet having circuit controlling means arranged at succeeding, equally spaced apart stations disposed along the length of the sheet, each of said stations being appropriated for the representation of a single character, a series of character representing units each consisting of a set of independent luminous elements, a set of circuits for each character representing unit, each set including a circuit for each luminous element, means for causing said circuits to be closed through the instrumentality of the circuit controlling means at said stations to cause the simultaneous illumination of the sets of luminous elements, and means for causing the sheet to be stepped the distance from station to station to operatively correlate the several stations with the sets of luminous elements.

LOUIS L. RUSTAD.